US010422304B2

(12) United States Patent
Ntone et al.

(10) Patent No.: US 10,422,304 B2
(45) Date of Patent: Sep. 24, 2019

(54) INLET DIFFUSERS FOR A TWO-STAGE ENGINE CHARGE AIR SYSTEM

(71) Applicant: Cummins Inc., Columbus, IN (US)

(72) Inventors: Francois Ntone, Columbus, IN (US); Philipe F. Saad, Columbus, IN (US); Rick Vaughan Lewis, Jr., Franklin, IN (US); Johnny C. Tsai, Columbus, IN (US); Nikhil Jayant Ajotikar, Columbus, IN (US)

(73) Assignee: Cummins Inc., Columbus, IN (US)

( * ) Notice: Subject to any disclaimer, the term of this patent is extended or adjusted under 35 U.S.C. 154(b) by 311 days.

(21) Appl. No.: 15/176,802

(22) Filed: Jun. 8, 2016

(65) Prior Publication Data

US 2017/0356399 A1 Dec. 14, 2017

(51) Int. Cl.
| | |
|---|---|
| *F02M 26/22* | (2016.01) |
| *F02B 5/02* | (2006.01) |
| *F02B 37/00* | (2006.01) |
| *F02B 37/013* | (2006.01) |
| *F02B 67/10* | (2006.01) |
| *F02B 75/22* | (2006.01) |

(52) U.S. Cl.
CPC ............... *F02M 26/22* (2016.02); *F02B 5/02* (2013.01); *F02B 37/004* (2013.01); *F02B 37/013* (2013.01); *F02B 67/10* (2013.01); *F02B 75/22* (2013.01); *Y02T 10/144* (2013.01)

(58) Field of Classification Search
CPC ............ F02B 5/02; F02B 75/22; F02M 26/22
See application file for complete search history.

(56) References Cited

U.S. PATENT DOCUMENTS

| | | | | |
|---|---|---|---|---|
| 5,440,881 A | * | 8/1995 | Sudmanns | F02B 75/22 60/605.1 |
| 5,531,484 A | * | 7/1996 | Kawano | F15D 1/04 138/39 |
| 5,577,900 A | * | 11/1996 | Ramsden | F02B 37/007 417/407 |
| 5,937,908 A | * | 8/1999 | Inoshiri | F15D 1/02 138/37 |
| 6,248,399 B1 | * | 6/2001 | Hehmann | C23C 14/14 137/561 A |

(Continued)

FOREIGN PATENT DOCUMENTS

| | | | | | |
|---|---|---|---|---|---|
| JP | 2008025564 A | * | 2/2008 | | F02B 33/44 |
| JP | 2015117632 A | * | 6/2015 | | F02B 37/013 |

*Primary Examiner* — Mary Davis
(74) *Attorney, Agent, or Firm* — Faegre Baker Daniels LLP

(57) ABSTRACT

An aftercooler is provided comprising a housing, an outlet diverter coupled to the housing and having an outlet port, and an inlet diffuser comprising a forward wall having a peripheral rim coupled to the housing, an upper wall connected to the forward wall, a lower wall connected to the forward wall, a first side wall connected to the upper wall and the lower wall and having a first end disposed adjacent the peripheral rim and a second end disposed adjacent an inlet port of the inlet diffuser, a second side wall connected to the upper wall and the lower wall and having a first end disposed adjacent the peripheral rim and a second end disposed adjacent the inlet port, and a plurality of fins disposed within an interior volume of the inlet diffuser collectively distributing air across an outlet opening of the inlet diffuser for delivery to the housing.

13 Claims, 17 Drawing Sheets

(56) References Cited

U.S. PATENT DOCUMENTS

| | | | | |
|---|---|---|---|---|
| 6,564,783 B2* | 5/2003 | Chou | .................. | F02B 29/0412 |
| | | | | 123/559.1 |
| 6,881,031 B2* | 4/2005 | Nomura | .............. | F04D 29/4226 |
| | | | | 415/154.1 |
| 7,048,035 B2* | 5/2006 | Farag | ................. | B60H 1/00028 |
| | | | | 138/39 |
| 8,113,182 B2* | 2/2012 | Wegner | ............... | F02B 29/0412 |
| | | | | 123/559.1 |
| 8,726,889 B2* | 5/2014 | Cockerill | ............ | F02B 29/0418 |
| | | | | 123/540 |
| 2007/0062679 A1* | 3/2007 | Agee | ......................... | F28F 9/02 |
| | | | | 165/158 |
| 2012/0168117 A1* | 7/2012 | Jairazbhoy | ......... | B60H 1/00028 |
| | | | | 165/48.1 |
| 2012/0325185 A1* | 12/2012 | Baumann | ............ | F02B 29/0412 |
| | | | | 123/568.15 |
| 2013/0263833 A1* | 10/2013 | Rothmund | .............. | F02B 75/22 |
| | | | | 123/568.12 |
| 2017/0356398 A1* | 12/2017 | Bremmer | ................ | F02B 75/22 |

* cited by examiner

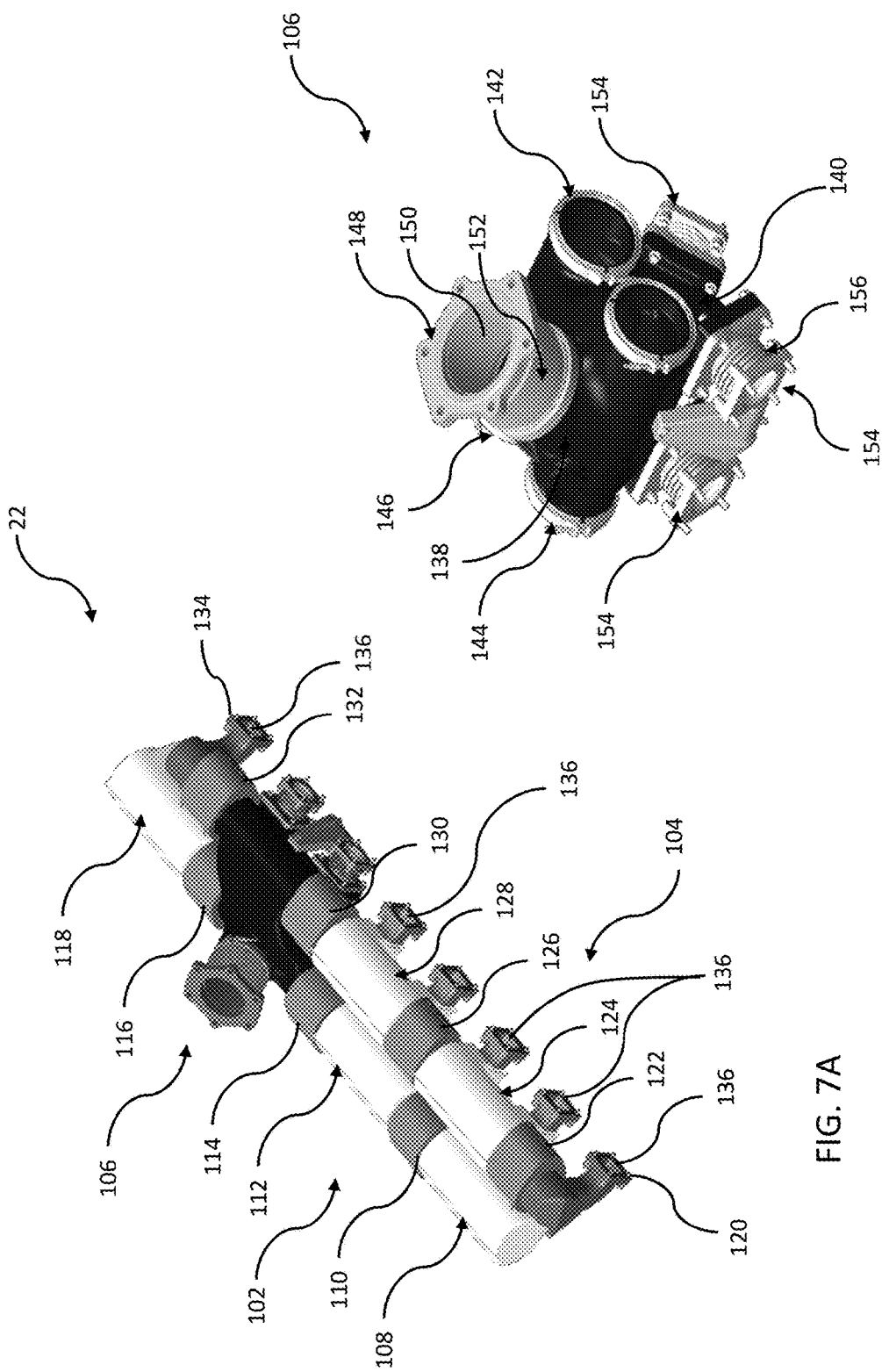

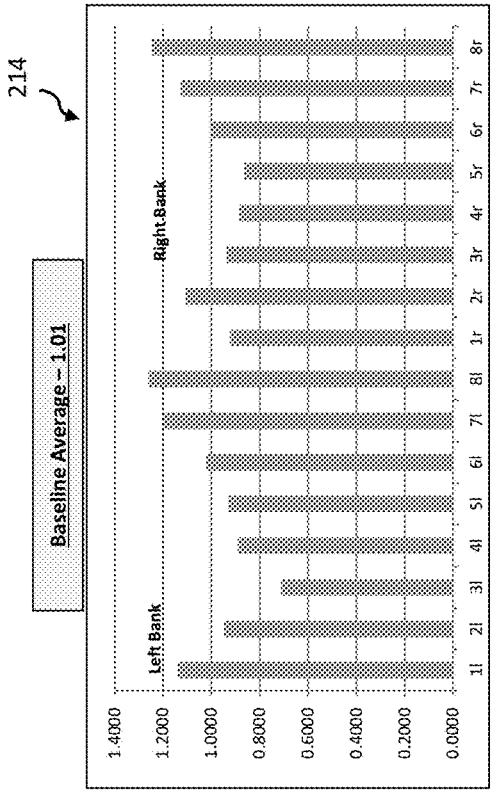
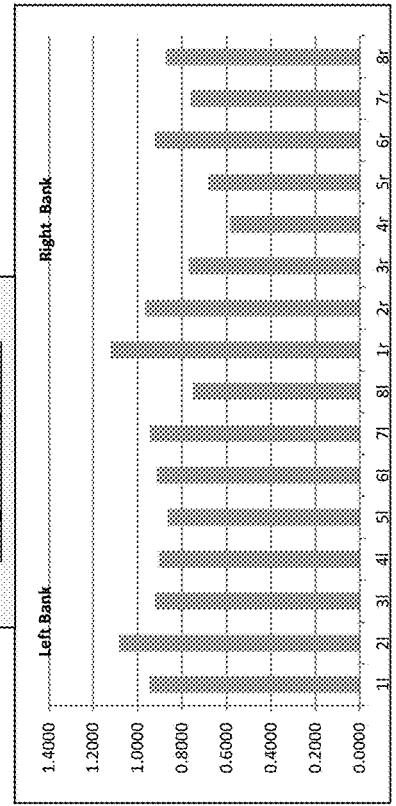
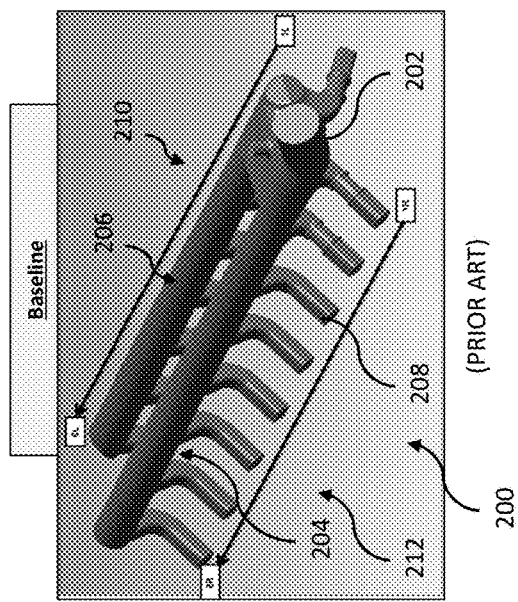
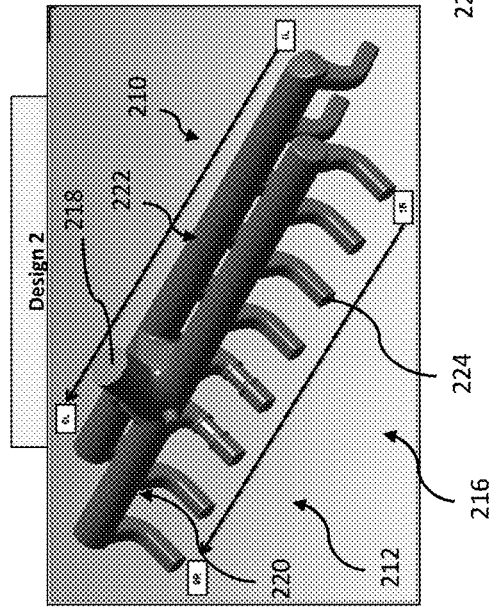
FIG. 8A (PRIOR ART)
FIG. 8B

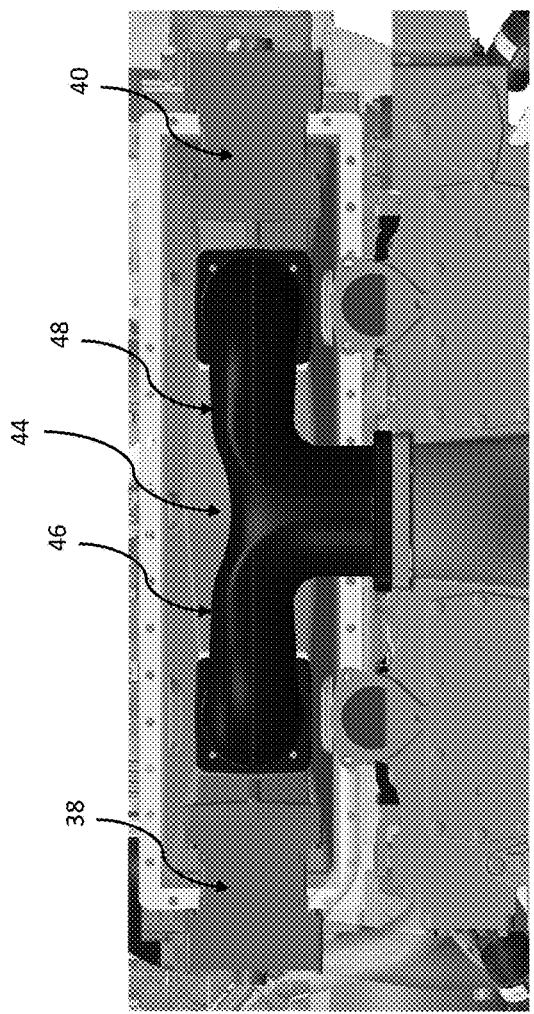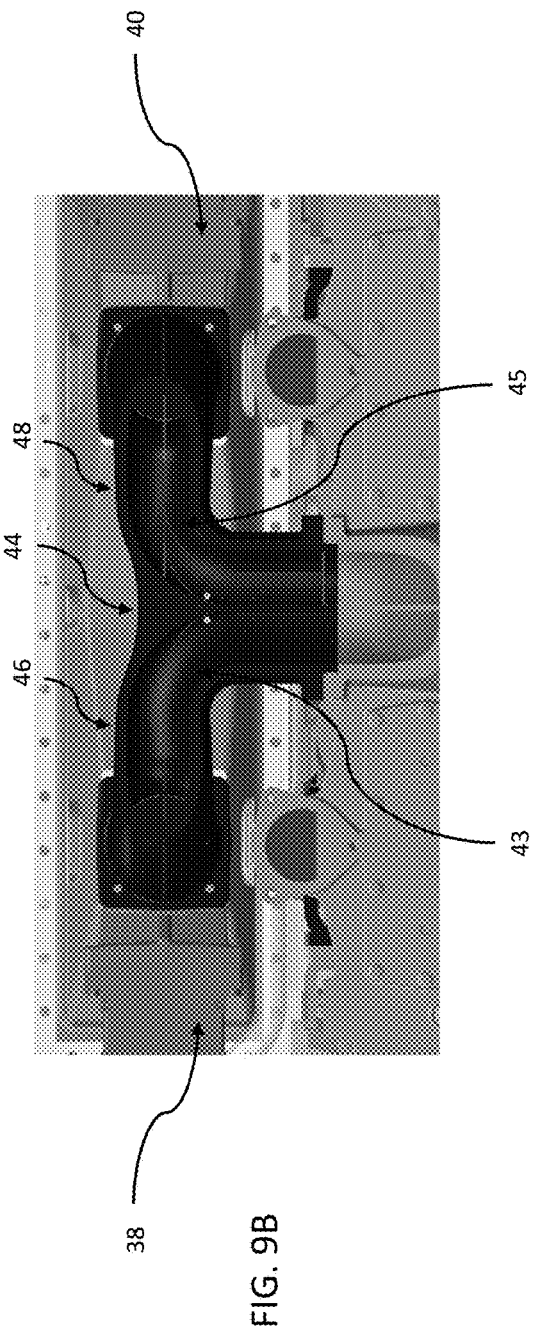
FIG. 9A
FIG. 9B

INLET DIFFUSERS FOR A TWO-STAGE ENGINE CHARGE AIR SYSTEM

TECHNICAL FIELD

The present invention relates generally to charge air systems, and more specifically to inlet diffuser designs for a two-stage engine charge air system packaged within the VEE on a spark-ignited engine.

BACKGROUND

Typically vehicle engines and engines used in other applications are housed within an engine compartment or other type of enclosure. It is generally a challenge to package the engine and all of the various on-engine components (e.g., turbochargers, aftercoolers, etc.) within the relatively tight spaces provided.

In many applications, some engine components are mounted adjacent the side of the engine. The more engine accessories or components mounted along the sides of the engine, however, the more difficult it is to access the engine for activities such as maintenance.

In VEE-configuration engines, it may be desirable to mount certain engine components "within the VEE," along the top of the engine. Some engine designs include a turbocharger and aftercooler mounted within the VEE. However, space is limited within the VEE, and the challenges of incorporating additional components within the VEE, such as an additional turbocharger and aftercooler in two-stage engine applications, have not been overcome by conventional approaches.

Accordingly, it is desirable to provide a two-stage engine charge air system mounted within the VEE of a spark-ignited engine.

SUMMARY

In one embodiment of the present disclosure, a system is provided comprising an engine having a first cylinder bank and a second cylinder bank disposed in a VEE configuration, each cylinder bank having a centerline that lies in a plane that passes through a crankshaft centerline, the planes defining a VEE above the crankshaft centerline, a low pressure turbocharger mounted within the VEE, an intercooler mounted within the VEE and coupled to the low pressure turbocharger to cool compressed air from the low pressure turbocharger, a high pressure turbocharger mounted within the VEE and coupled to an output of the intercooler, and an aftercooler mounted within the VEE and coupled to the high pressure turbocharger to cool compressed air from the high pressure turbocharger, wherein the intercooler comprises an inlet diffuser coupled to an outlet of a compressor of the low pressure turbocharger, the inlet diffuser being configured to distribute air across an outlet opening of the inlet diffuser for delivery to a housing of the intercooler. In one aspect of this embodiment, the aftercooler comprises an inlet diffuser coupled to an outlet of a compressor of the high pressure turbocharger, the inlet diffuser of the aftercooler being configured to distribute air across an outlet opening of the inlet diffuser of the aftercooler for delivery to a housing of the aftercooler. In another aspect, the inlet diffuser of the intercooler further comprises a forward wall having a peripheral rim with a plurality of through holes for receiving fasteners to secure the inlet diffuser of the intercooler to the housing of the intercooler. In a variant of this aspect, the inlet diffuser of the intercooler further comprises a pair of side walls, a lower wall and an upper wall, each side wall being connected between the lower wall and the upper wall and tapering in width from a first end adjacent the peripheral rim to a second end adjacent a central area of the inlet diffuser of the intercooler. In a further variant, the lower wall extends from the peripheral rim to the central area and is connected to the side walls, the lower wall comprising an opening configured to couple to the outlet of the compressor of the low pressure turbocharger. In a further variant, the opening is disposed in the central area. In still a further variant, the inlet diffuser of the intercooler further comprises a plurality of ribs extending between the upper wall and the forward wall. In another aspect of this embodiment, the inlet diffuser of the aftercooler further comprises a forward wall having a peripheral rim with a plurality of through holes for receiving fasteners to secure the inlet diffuser of the aftercooler to the housing of the aftercooler. In a variant of this aspect, the inlet diffuser of the aftercooler further comprises a pair of side walls, a lower wall and an upper wall, each side wall being connected between the lower wall and the upper wall and having a first end disposed adjacent the peripheral rim and a second end disposed adjacent an inlet port of the inlet diffuser of the aftercooler. In another variant, the upper wall and the lower wall taper in width from the inlet port to a first end of the inlet diffuser of the aftercooler and from the inlet port to a second end of the inlet diffuser of the aftercooler. In yet another variant, the inlet diffuser of the aftercooler further comprises a plurality of fins disposed within an interior volume of the inlet diffuser of the aftercooler and extending between the upper wall and the lower wall, the plurality of fins collectively distributing air across an outlet opening of the inlet diffuser of the aftercooler for delivery to a housing of the aftercooler.

In another embodiment of the present disclosure, an inlet diffuser for an aftercooler is provided comprising a forward wall having a peripheral rim with a plurality of through holes for receiving fasteners to secure the inlet diffuser to a housing of the aftercooler, an upper wall connected to the forward wall, a lower wall connected to the forward wall, a first side wall connected to the upper wall and the lower wall and having a first end disposed adjacent the peripheral rim and a second end disposed adjacent an inlet port of the inlet diffuser, a second side wall connected to the upper wall and the lower wall and having a first end disposed adjacent the peripheral rim and a second end disposed adjacent the inlet port, and a plurality of fins disposed within an interior volume of the inlet diffuser and extending between the upper wall and the lower wall, the plurality of fins collectively distributing air across an outlet opening of the inlet diffuser for delivery to the housing of the aftercooler. In one aspect of this embodiment, the upper wall and the lower wall taper in width from the inlet port to a first end of the inlet diffuser and from the inlet port to a second end of the inlet diffuser. In another aspect, the first side wall is longer than the second side wall and the inlet port is offset from a central region of the inlet diffuser. In still another aspect, the plurality of fins includes a first fin which is substantially straight and slanted toward a first end of the inlet diffuser with distance from the inlet port toward the forward wall. In a variant of this aspect, the plurality of fins includes a second fin which is substantially straight, partially disposed within the inlet port, and slanted toward a second end of the inlet diffuser with distance from the inlet port toward the forward wall. In another variant, the plurality of fins includes a third fin which is substantially straight and slanted toward the first end of the inlet diffuser with distance from the inlet port toward the forward wall. In yet another variant, the plurality of fins includes a fourth fin which is substantially straight and slanted toward the second end of the inlet diffuser with distance from the inlet port toward the forward wall. In still another variant, the plurality of fins includes a fifth fin which is curved in an elongated S-shape and slanted toward the second end of the inlet diffuser with distance from the inlet port toward the forward wall, the fifth fin having one end disposed within inlet port and another end disposed adjacent the forward wall. In another variant, the plurality of fins includes a sixth fin which is partially curved at a first end and slanted toward the second end of the inlet diffuser with distance from the inlet port toward the forward wall, the first end of the sixth fin being disposed within the inlet port and a second end of the sixth fin being disposed adjacent the forward wall.

In another embodiment of the present disclosure, an aftercooler is provided comprising a housing, an outlet diverter coupled to the housing and having an outlet port configured to deliver cooled air from the aftercooler, and an inlet diffuser comprising a forward wall having a peripheral rim coupled to the housing, an upper wall connected to the forward wall, a lower wall connected to the forward wall, a first side wall connected to the upper wall and the lower wall and having a first end disposed adjacent the peripheral rim and a second end disposed adjacent an inlet port of the inlet diffuser, a second side wall connected to the upper wall and the lower wall and having a first end disposed adjacent the peripheral rim and a second end disposed adjacent the inlet port, and a plurality of fins disposed within an interior volume of the inlet diffuser and extending between the upper wall and the lower wall, the plurality of fins collectively distributing air across an outlet opening of the inlet diffuser for delivery to the housing of the aftercooler. In one aspect of this embodiment, the upper wall and the lower wall taper in width from the inlet port to a first end of the inlet diffuser and from the inlet port to a second end of the inlet diffuser. In another aspect, the first side wall is longer than the second side wall and the inlet port is offset from a central region of the inlet diffuser.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

BRIEF DESCRIPTION OF THE DRAWINGS

The above-mentioned and other features of this disclosure and the manner of obtaining them will become more apparent and the disclosure itself will be better understood by reference to the following description of embodiments of the present disclosure taken in conjunction with the accompanying drawings, wherein:

FIG. 7A is a perspective view of an exhaust manifold according to one embodiment of the present disclosure;
FIG. 7B is a perspective view of a cross-over collector of the exhaust manifold of FIG. 7A;
FIG. 8A depicts a prior art exhaust manifold and an associated graph of exhaust loss coefficients;
FIG. 8B depicts an exhaust manifold according to the principles of the present disclosure and an associated graph of exhaust loss coefficients;
FIG. 9A is a top plan view of components of a charge air distribution system according to the principles of the present disclosure;
FIG. 9B is a top plan view of the charge air distribution system of FIG. 9A, shown partly in section.

Figure 1:
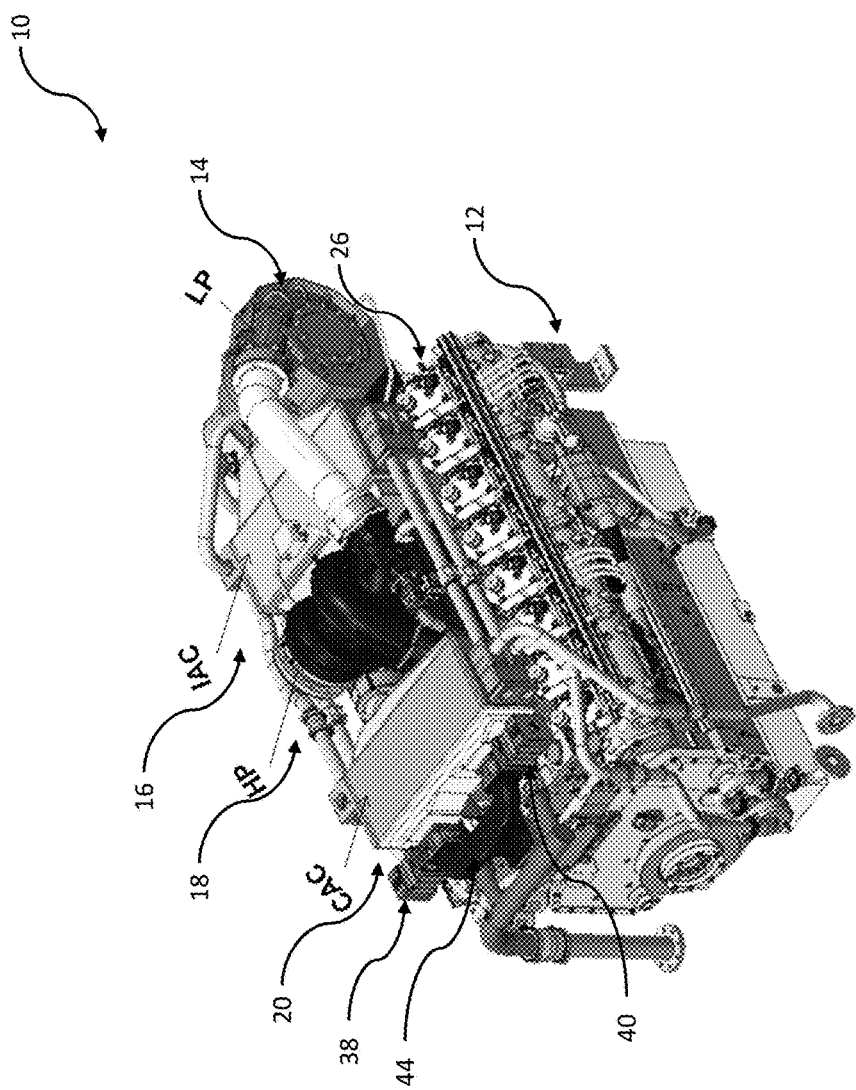
FIG. 1 is a perspective view of a two-stage turbo system according to the principles of the present disclosure.

While the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

FIGS. 1-4 depict a two-stage turbo system according to the principles of the present disclosure. In general, system 10 includes a VEE-configuration engine 12, a low pressure turbocharger 14, an inter-stage air cooler 16 (or intercooler 16), a high pressure turbocharger 18, a charge air cooler 20 (or aftercooler 20) and an exhaust manifold 22 (FIGS. 7A-B). As described in more detail below, both turbochargers 14, 18, both coolers 16, 20 and exhaust manifold 22 are located on top of engine 12 within the VEE. Engine 12 may have any number of cylinders and may be a compression engine or a spark-ignited engine. Certain applications of the present disclosure include engines having 140 mm or larger bore sizes.

Figure 2:
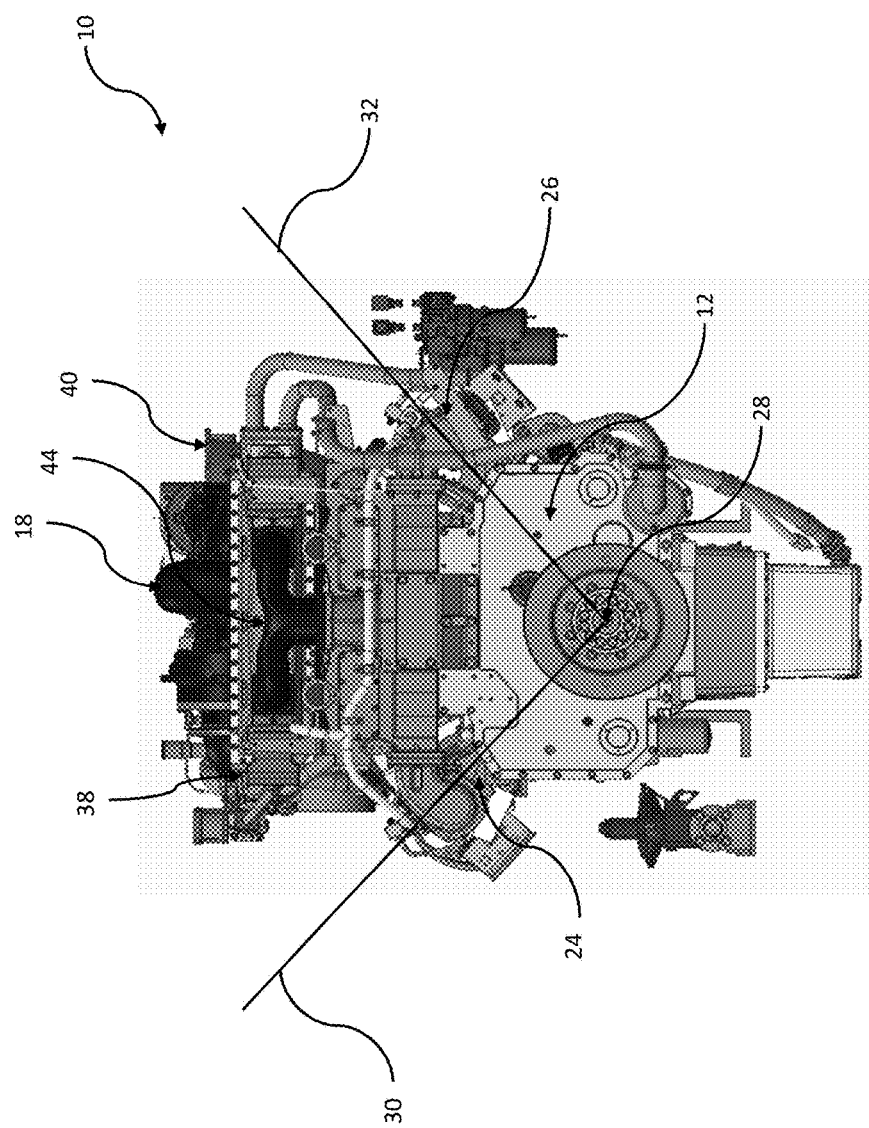
FIG. 2 is an end view of the system of FIG. 1.

FIG. 2 more clearly shows the VEE mounting location of the components mentioned above. As shown, engine 12 includes two banks 24, 26 of cylinders which are mounted at an angle relative to the engine crankshaft centerline 28. Each bank 24, 26 of cylinders has a centerline. A plane 30 passing through crankshaft centerline 28 and the centerline of cylinder bank 24 and a plane 32 passing through crankshaft centerline 28 and the centerline of cylinder bank 26 define side boundaries of the VEE. As shown in FIG. 1, the VEE may extend from the front of engine 12 to the rear of engine 12, and even somewhat beyond the forwardmost and rearwardmost locations of the engine. More specifically, while low pressure turbocharger 14 is oriented beyond the end of engine 12, it is still located within the VEE.

Figure 3:
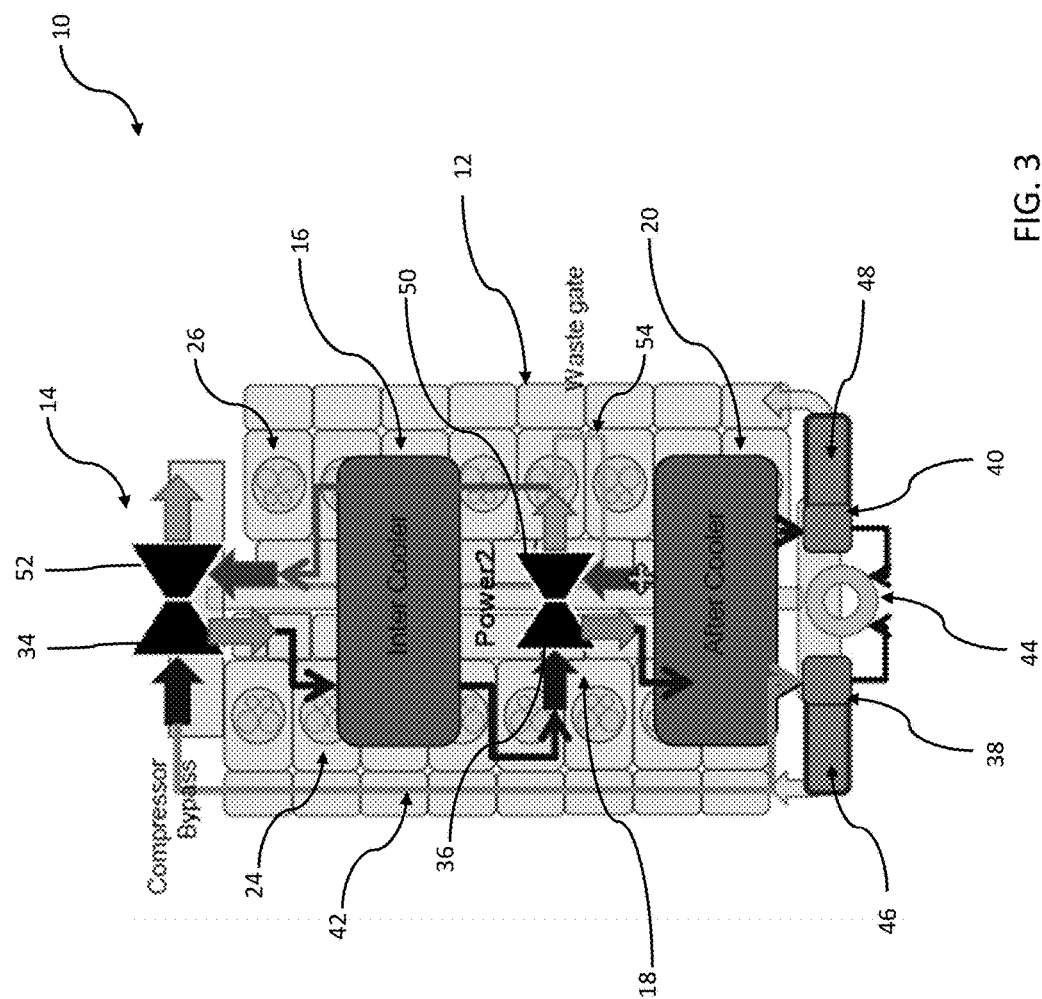
FIG. 3 is a conceptual top view of the system of FIG. 1.

Referring now to FIG. 3, a conceptual top view of system 10 is shown. Air or an air/fuel mixture (depending upon where fuel is introduced into system 10) exits compressor 34 of low pressure turbocharger 14 and is routed to an input of intercooler 16 (described in detail below). After cooling in intercooler 16 to increase its density, the air is routed to the compressor 36 of high pressure turbocharger 18. Air expelled from compressor 36 is routed to aftercooler 20 (described in detail below), where it is again cooled to increase its density. Air is then routed from aftercooler 20 into throttles 38, 40. It should be understood, however, that under certain engine operating conditions, such as very cold weather start-up conditions, some air from aftercooler 20 is routed back to low pressure turbocharger 14 via compressor bypass line 42. In this manner, compressor bypass line 42 functions as a kind of a wastegate for the compression side of system 10. Under normal operating conditions, compressor bypass line 42 is closed.

Throttle 38 services cylinder bank 24 and throttle 40 services cylinder bank 26. In one embodiment of the present disclosure, throttles 38, 40 are monitored and controlled by an on-engine electronic control system (not shown) to ensure each throttle is providing even distribution to the respective cylinder banks. In addition to this bank-to-bank balancing, provision of two throttles 38, 40 permits control over and compensation for innate bank-to-bank differences in terms of air restriction characteristics. Air from throttles 38, 40 is routed into thermal housing 44, then distributed left and right to cylinder banks 24, 26 by first branch conduit 46 and second branch conduit 48, respectively. It should be understood that the flow of air from throttles 38, 40 remains separate as it is passed through thermal housing 44. As best shown in FIGS. 9A-B, two separate flow paths 43, 45 are provided through thermal housing 44—flow path 43 for air from throttle 38 and flow path 45 for air from throttle 40.

Exhaust from engine 12 is routed from exhaust manifold 22 (described in detail below) into the turbine 50 of high pressure turbocharger 18, and from turbine 50 to turbine 52 of low pressure turbocharger 14. From low pressure turbocharger 14, the exhaust is typically routed to an aftertreatment system (not shown). It should be understood that system 10 further includes an exhaust wastegate 54 which permits a controllable about of exhaust from engine 12 to bypass high pressure turbocharger 18.

Figure 5:
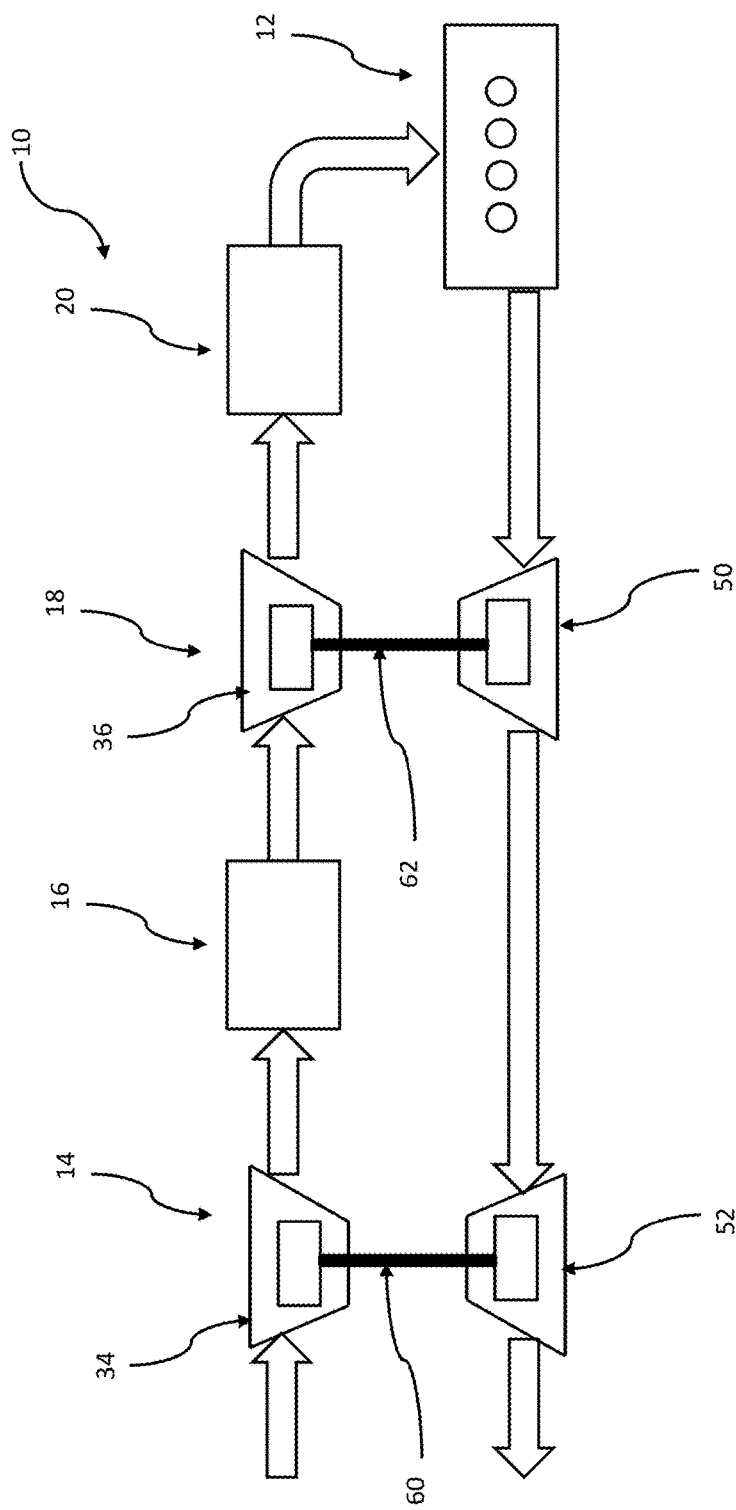
FIG. 5 is a conceptual diagram of a two-stage turbo system according to the principles of the present disclosure.

FIG. 5 is a conceptual diagram of system 10 according to the present disclosure. As shown, system 10 includes engine 12, low pressure turbocharger 14, intercooler 16, high pressure turbocharger 18, and aftercooler 20. Low pressure turbocharger 14 includes a compressor 34 and a turbine 52 connected together by a rod 60 or other mechanical connection. High pressure turbocharger 18 includes a compressor 36 and a turbine 50 connected together by a rod 62 or other mechanical mechanism. Compressor 34 of low pressure turbocharger 14 may receive air or a mixture of air and fuel as is further described below. For simplicity, system 10 will be described as receiving a charge, although it should be understood that the fuel component of the charge may be introduced at various locations upstream of engine 12. As shown, the charge to the engine 12 is provided through the two-stage system via turbocharger 14, intercooler 16, turbocharger 18 and aftercooler 20. The exhaust from engine 12 powers turbines 50, 52 of turbochargers 18, 16 respectively, which each power their respective compressors via rods 62, 60.

Figure 6:
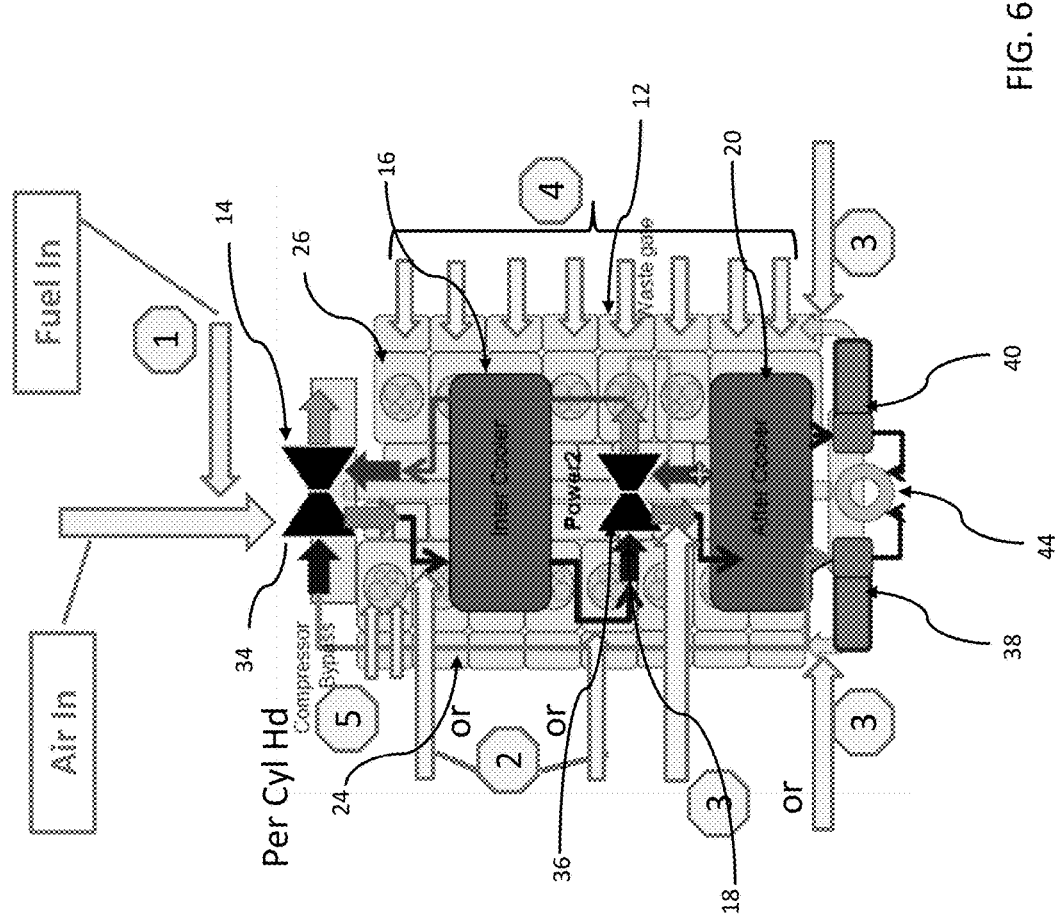
FIG. 6 is a conceptual top view of the system of FIG. 1 depicting different locations for injecting fuel to mix with air.

Referring now to FIG. 6, various locations are shown for the introduction of fuel into the air in system 10. As indicated by number 1, fuel may be introduced into the air flow provided to compressor 34 of low pressure turbocharger 14. Fuel introduced at this location may have a pressure of 1 to 5 psia in certain applications. Fuel may also be introduced at location 2, either upstream of intercooler 16 or just downstream of intercooler 16. Fuel introduced at this location may have a pressure of 5 to 50 psia in certain applications. Alternatively, fuel may be introduced at the location labeled 3, after the compressor 36 of high pressure turbocharger 18 and upstream of aftercooler 20 or after aftercooler 20 and upstream of throttles 38, 40. Fuel introduced at this location may have a pressure of 80 to 85 psia in certain applications. In the alternative, fuel may be introduced at fuel injector ports as indicated by number 4. This introduction is just ahead of the cylinder head intake ports. Fuel introduced at this location may have a pressure of 80 to 85 psia in certain applications. Finally, fuel may be introduced at location 5, at the intake ports of the fuel injectors. Fuel introduced at this location may have a pressure of 90 to 95 psia in certain applications.

To accommodate the within the VEE location of turbochargers 14, 18 and coolers 16, 20, various aspects of the exhaust system, air/fuel mixture distribution, pressure distribution balancing and mechanical connections were modified. Referring to FIG. 7, the manner in which exhaust is gathered adjacent the center of the VEE between cylinder banks 24, 26 is described below. In order to accommodate the two-stage turbo design within the VEE, exhaust manifold 22 is configured for positioning within the VEE and includes central logs 102, 104 and a cross-over connector 106 within the VEE to route exhaust gas from the central logs 102, 104 to high pressure turbocharger 18. The location of the high pressure turbocharger 18 within the VEE is the primary driver of the design of exhaust manifold 22. Further description of the exhaust manifold may be found in co-pending and co-owned patent application Ser. No. 15/176,625, entitled "EXHAUST MANIFOLD FOR A TWO-STAGE ENGINE CHARGE AIR SYSTEM," filed on Jun. 8, 2016 , the entire contents of which being expressly incorporated herein by reference.

Log 102 includes inlet segment 108, bellows 110, inlet segment 112, bellows 114, bellows 116 and inlet segment 118. Log 104 includes single port section 120, bellows 122, inlet segment 124, bellows 126, inlet segment 128, bellows 130, bellows 132, and single port section 134. Each inlet segment of logs 102, 104 includes two inlet ports 136 (only shown for log 104) which are routed to the head of engine 12 to collect exhaust from the cylinders. Single port sections 120, 134 each also include an inlet port 136. Bellows 110, 114, 116, 122, 126, 130 and 132 are provided to accommodate thermal expansion of all of the inlet segments, cross-over collector 106 and single port sections 120, 134, all of which include at least one inlet port 136 for receiving high temperature exhaust gases from the cylinders of engine 12.

As best shown in FIG. 7B, cross-over collector 106 includes a housing 138, an intake opening 140 for coupling to bellows 114, an intake opening 142 for coupling to bellows 130, an intake opening 144 for coupling to bellows 116 and an intake opening 146 for coupling to bellows 132. Each of openings 140, 142, 144, 146 are in flow communication with a central cavity (not shown) within collector 106. Also in flow communication with the central cavity is an outlet 148 configured to couple to turbine 50 of high pressure turbocharger 18. Outlet 148 includes a central opening 150 which delivers exhaust to turbocharger 18 and a bellows 152 to provide thermal isolation between collector 106 and turbocharger 18. Collector 106 also includes four inlet ports 154 (three shown) configured to couple to the head of engine 12 to collect exhaust from the cylinders. The inlet ports 154 each include a bellows 156 to accommodate for thermal expansion. The inlet ports 154 are all in flow communication with the central cavity of collector 106.

As shown, inlet ports 136 of log 102 and two of inlet ports 154 of collector 106 are positioned to couple to cylinders of a first bank of cylinders (such as bank 26) and inlet ports 136 of log 104 and two of inlet ports 154 of collector 106 are positioned to couple to cylinders of a second bank of cylinders (such as bank 24). The first bank of cylinders includes a first cylinder, a last cylinder and a plurality of cylinders in line between the first cylinder and the last cylinder, two of which are coupled to the inlet ports 154 of collector 106. Similarly, the second bank of cylinders includes a first cylinder, a last cylinder and a plurality of cylinders in line between the first cylinder and the last cylinder, two of which are coupled to the inlet ports 154 of collector 106.

It should be understood that in certain conventional approaches, high pressure turbocharger 18 is located forward or rearward of engine 12 (i.e., such as the location of low pressure turbocharger 14 of the present disclosure) where structure exists to support turbocharger 18. In such approaches, exhaust is collected at the end of logs 102, 104 for delivery to high pressure turbocharger 18. If a two-stage turbocharger configuration is implemented in such conventional systems, the low pressure turbocharger 14 may be placed on top of engine 12, which adds several hundred pounds of mass to the top of engine 12.

By configuring collector 106 for placement intermediate the ends of engine 12, it is possible to locate the lower weight high pressure turbocharger 18 on top of engine 12. Moreover, exhaust flow losses may be reduced (resulting in better fuel economy) because each flow path traverses a smaller distance. A more tortured path such as in conventional systems requires more pressure, which leads to greater flow losses. An example of this is depicted in FIG. 8A. A prior art baseline exhaust manifold 200 is shown having a collector 202 at the end of logs 204, 206. Inlet ports 208 for each cylinder of the left bank 210 and the right bank 212 are labeled from right to left 1L through 8L and 1R through 8R, respectively. The corresponding exhaust loss coefficient for each inlet port 208 is shown in chart 214. As shown, the inlet ports 208 having the greatest loss coefficient are 8L and 8R, which are located farthest from collector 202.

A redesigned exhaust manifold 216 (like that of the present disclosure) is shown in FIG. 8B having a collector 218 intermediate the ends of logs 220, 222. The inlet ports 224 have the same labels as inlet ports 208. As shown in chart 226, which depicts the exhaust loss coefficient for each inlet port 224 of manifold 216, the less tortured paths of exhaust from inlet ports 224 through logs 220, 222 to collector 218 (relative to the paths from inlet ports 208 to collector 106) results in lower loss coefficients for several cylinders, and a lower overall loss coefficient of 0.87 (as compared to 1.01 for manifold 200).

Figure 4:
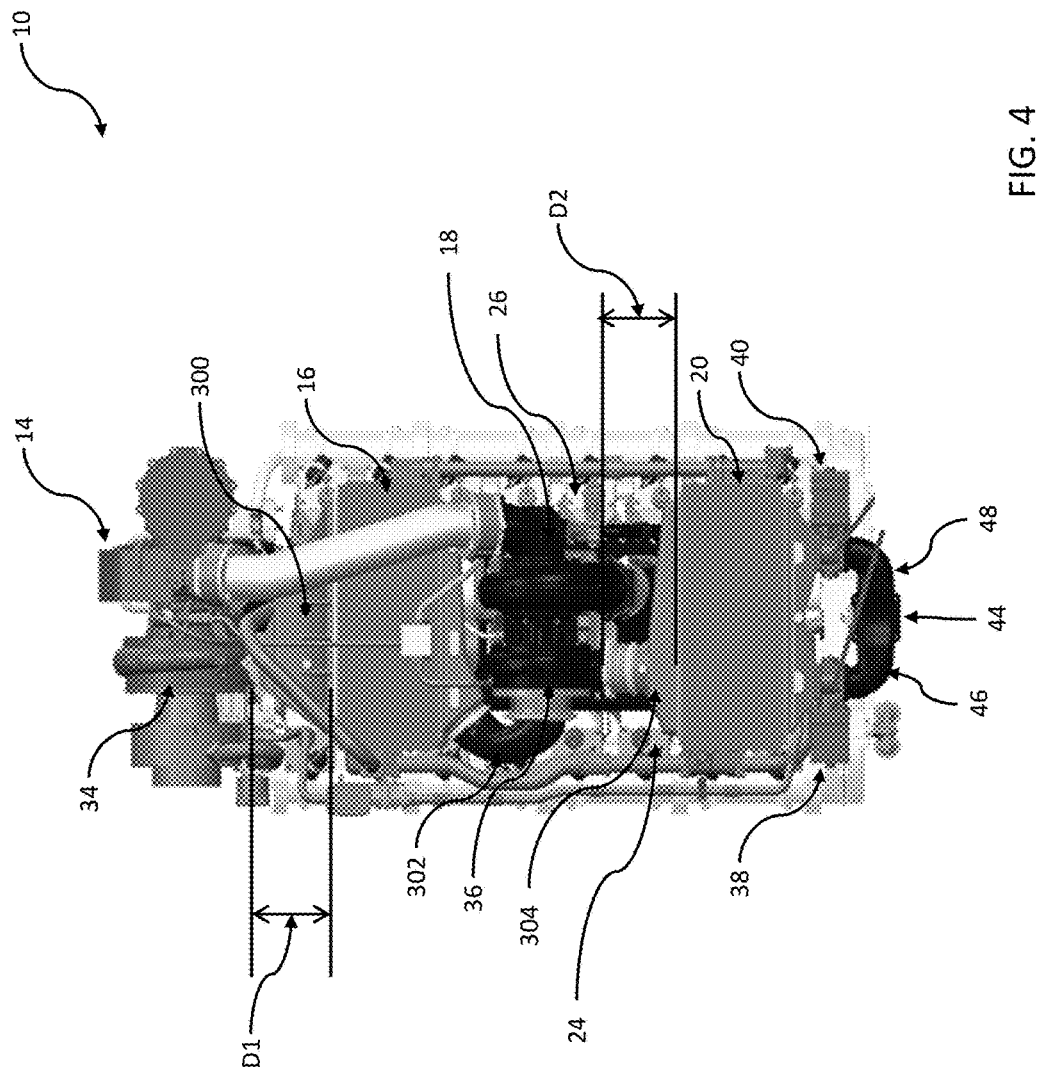
FIG. 4 is a top plan view of the system of FIG. 1.
Figure 10:
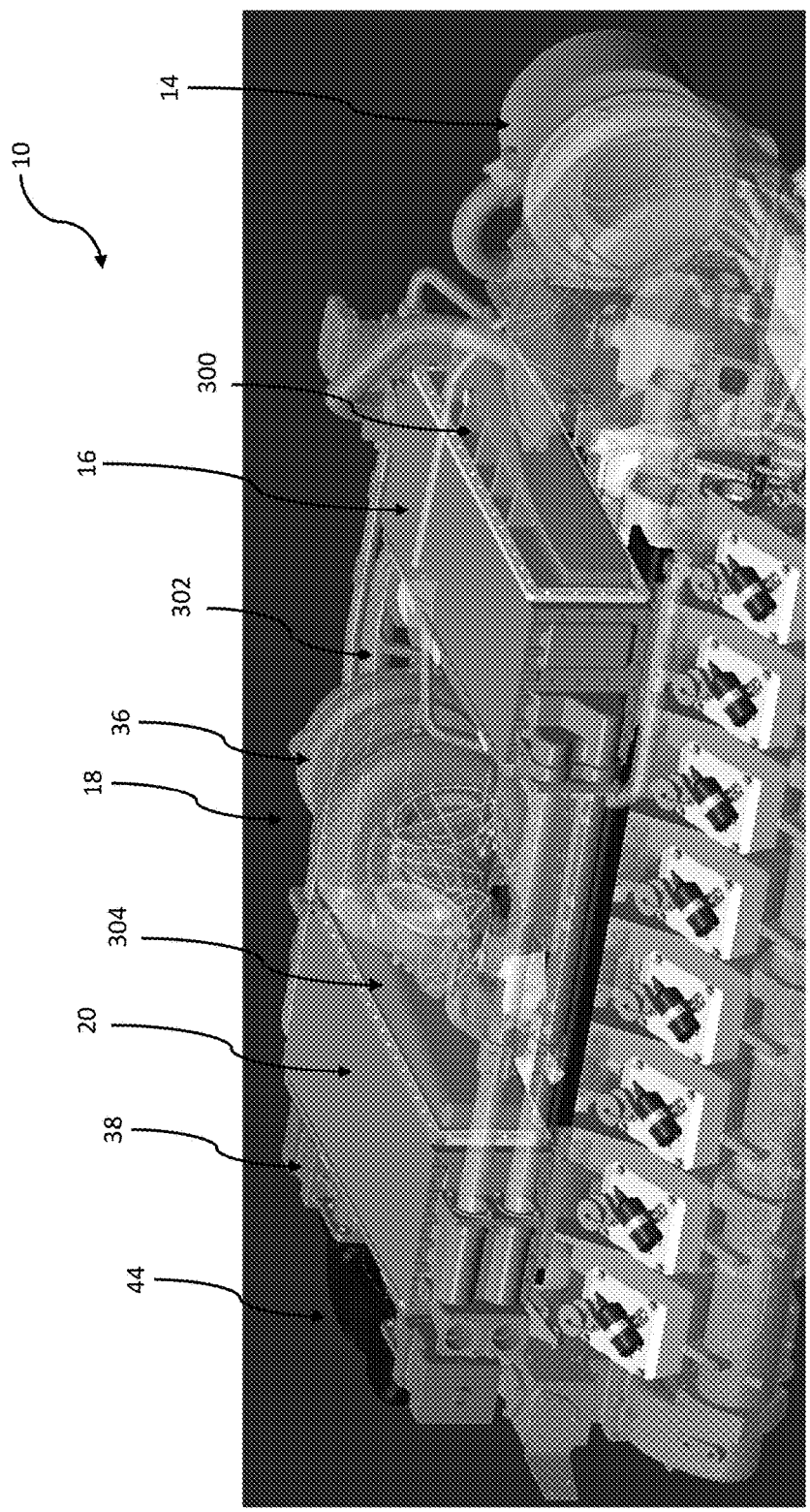
FIG. 10 is a perspective view of the system of FIG. 1.

Referring to FIG. 4 and FIG. 10, compressor 34 of low pressure turbocharger 14 compresses intake air (and in some embodiments fuel) for delivery to aftercooler 16. As shown in FIG. 4, the distance D1 between compressor 34 and aftercooler 16 is small. Consequently, there is very little opportunity to distribute the heated air across the inlet of intercooler 16. To accommodate this air distribution, an inlet diffuser 300 is provided as is further described below. The lower temperature air from intercooler 16 is delivered through tube 302 to compressor 36 of high pressure turbocharger 18, which even further increases the pressure of the air. The resulting high pressure (and reheated) air is then delivered to aftercooler 20, and routed through throttles 38, 40 to engine 12 in the manner described above. As shown, the distance D2 between compressor 36 and aftercooler 20 is also small, leaving little opportunity for distribution of the heated air laterally across the inlet of aftercooler 20. To provide for this air distribution, an inlet diffuser 304 is provided as is further described below. It should be understood from the foregoing that depending upon the location of fuel introduction into the compressed air flow (see FIG. 6), either or both of inlet diffusers 300, 304 may also perform a fuel mixing function.

Figure 11:
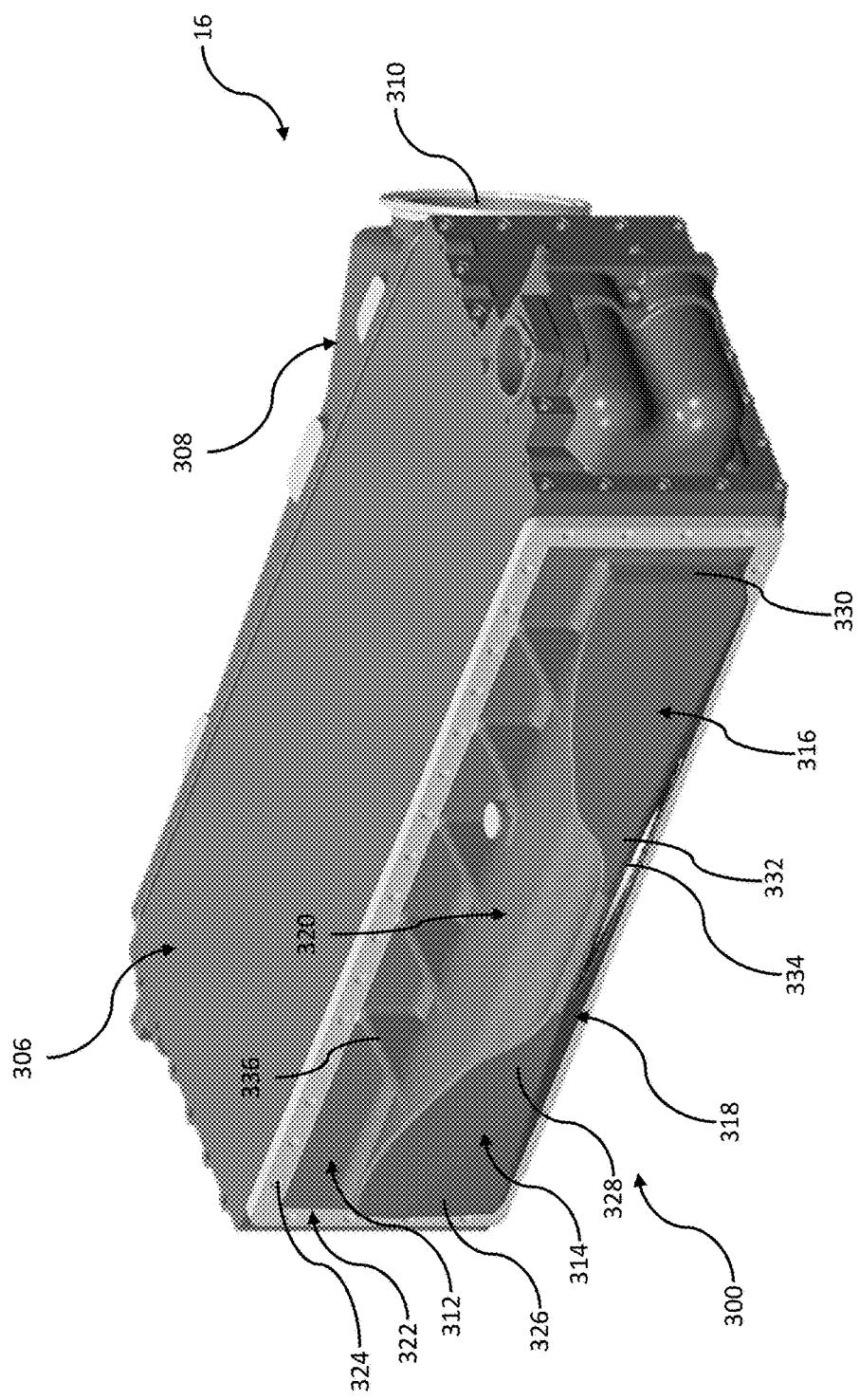
FIG. 11 is a perspective view of an intercooler of the system of FIG. 1.

Referring now to FIG. 11, intercooler 16 is shown with inlet diffuser 300. As shown, in addition to inlet diffuser 300, intercooler 16 includes a housing 306 and an outlet diverter 308. Housing 306 is substantially wider than it is tall. Outlet diverter 308 includes an outlet port 310 which is coupled to tube 302 (FIG. 10) to route cooled air to compressor 36 of high pressure turbocharger 18.

Figure 12A:
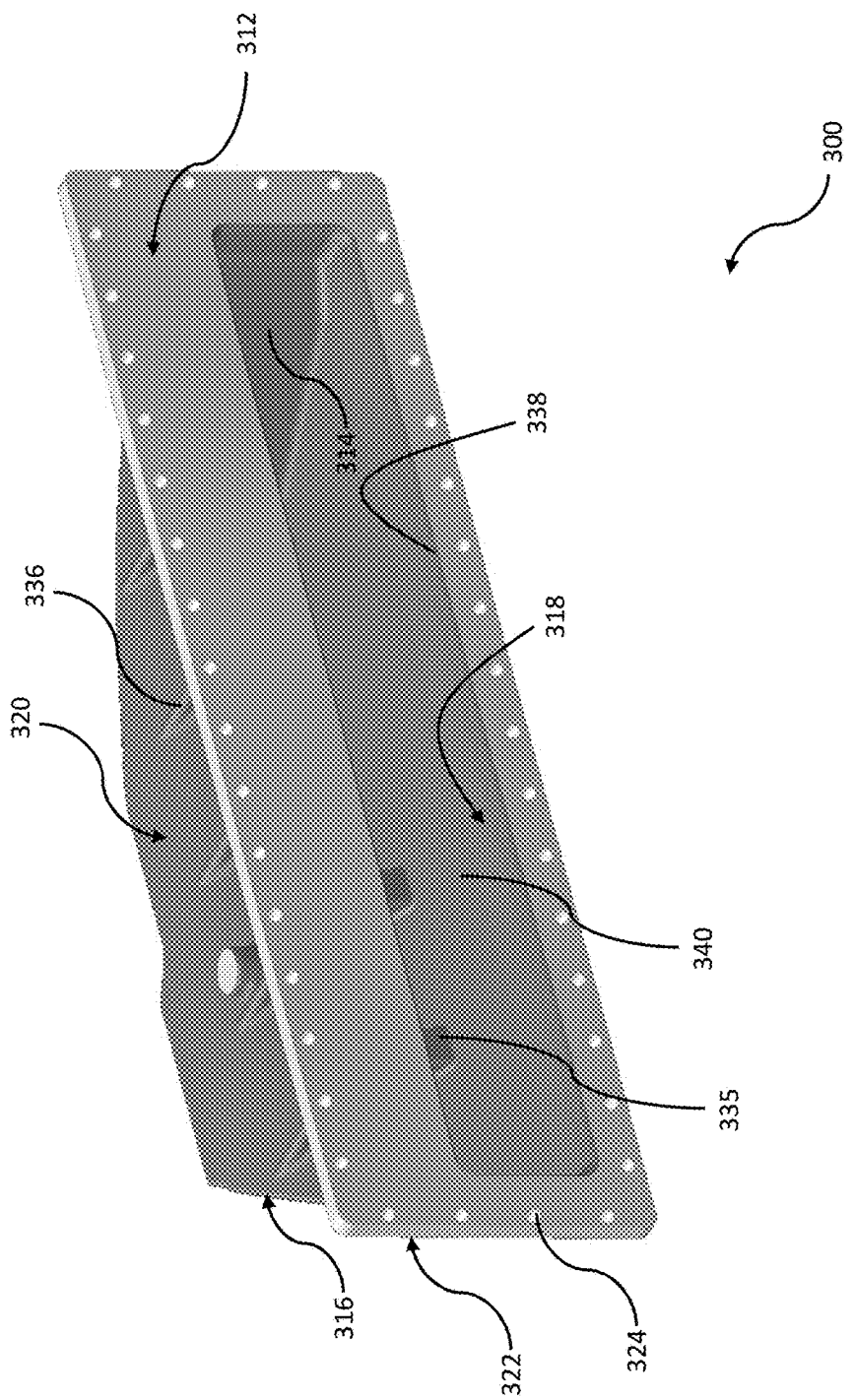
FIG. 12A is a perspective view of an inlet diffuser of the intercooler of FIG. 11.
Figure 12B:
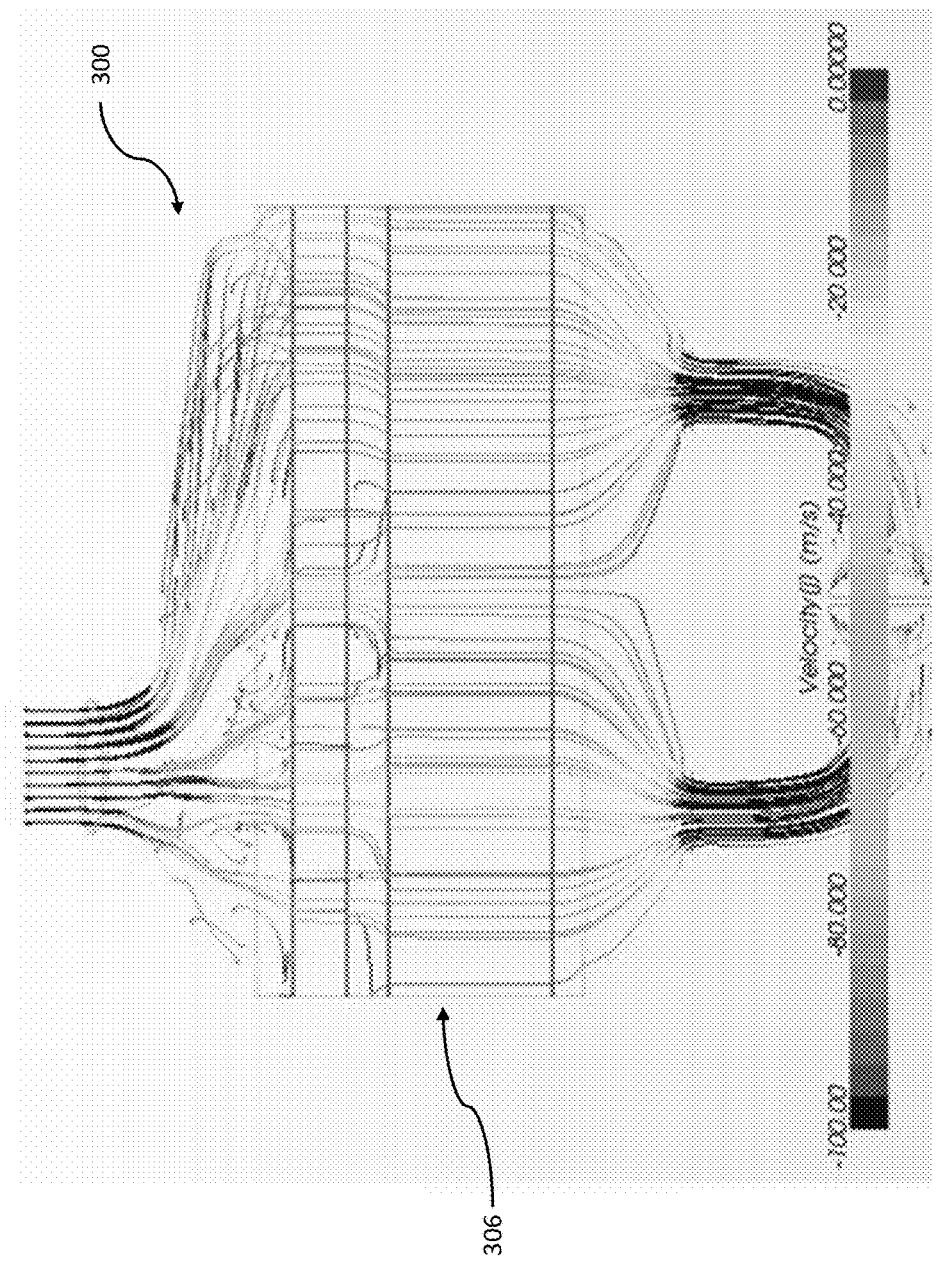
FIG. 12B is a top view of air flow through an inlet diffuser of the intercooler of FIG. 11.

Referring now to FIGS. 11 and 12A-12B, inlet diffuser 300 generally includes a forward wall 312, a pair of side walls 314, 316, a lower wall 318 and an upper wall 320. Forward wall 312 includes a peripheral rim 322 with a plurality of through holes 324 for receiving fasteners (not shown) to secure diffuser 300 to housing 306 of intercooler 16. Side wall 314, which is connected to lower wall 318 and upper wall 320, tapers in width from an end 326 adjacent rim 322 to an end 328 adjacent a central area of diffuser 300. Similarly, side wall 316 is connected between lower wall 318 and upper wall 320 and tapers in width from an end 330 adjacent rim 322 to an end 332 adjacent a central area of diffuser 300. Lower wall 318 extends from rim 322 to the central area of diffuser 300 and is connected to side walls 314, 316. Lower wall 318 includes an opening 334 which is configured to couple to an outlet of compressor 34 of low pressure turbocharger 14. Lower wall 318 further includes at least one protrusion 335 which assists in distribution of flow through diffuser 300. Upper wall 320 extends from forward wall 312 to side walls 314, 316 and lower wall 318. A plurality of ribs 336 extend between upper wall 320 and forward wall 312 to increase the rigidity of diffuser 300. As best shown in FIG. 12A, forward wall 312 forms an opening 338 which delivers air to housing 306, and forward wall 312, side walls 314, 316, lower wall 318 and upper wall 320 define an interior volume 340 of diffuser 300 across which air is distributed for delivery to housing 306. The upper portion of FIG. 12B depicts the flow of air through diffuser 300.

Figure 13:
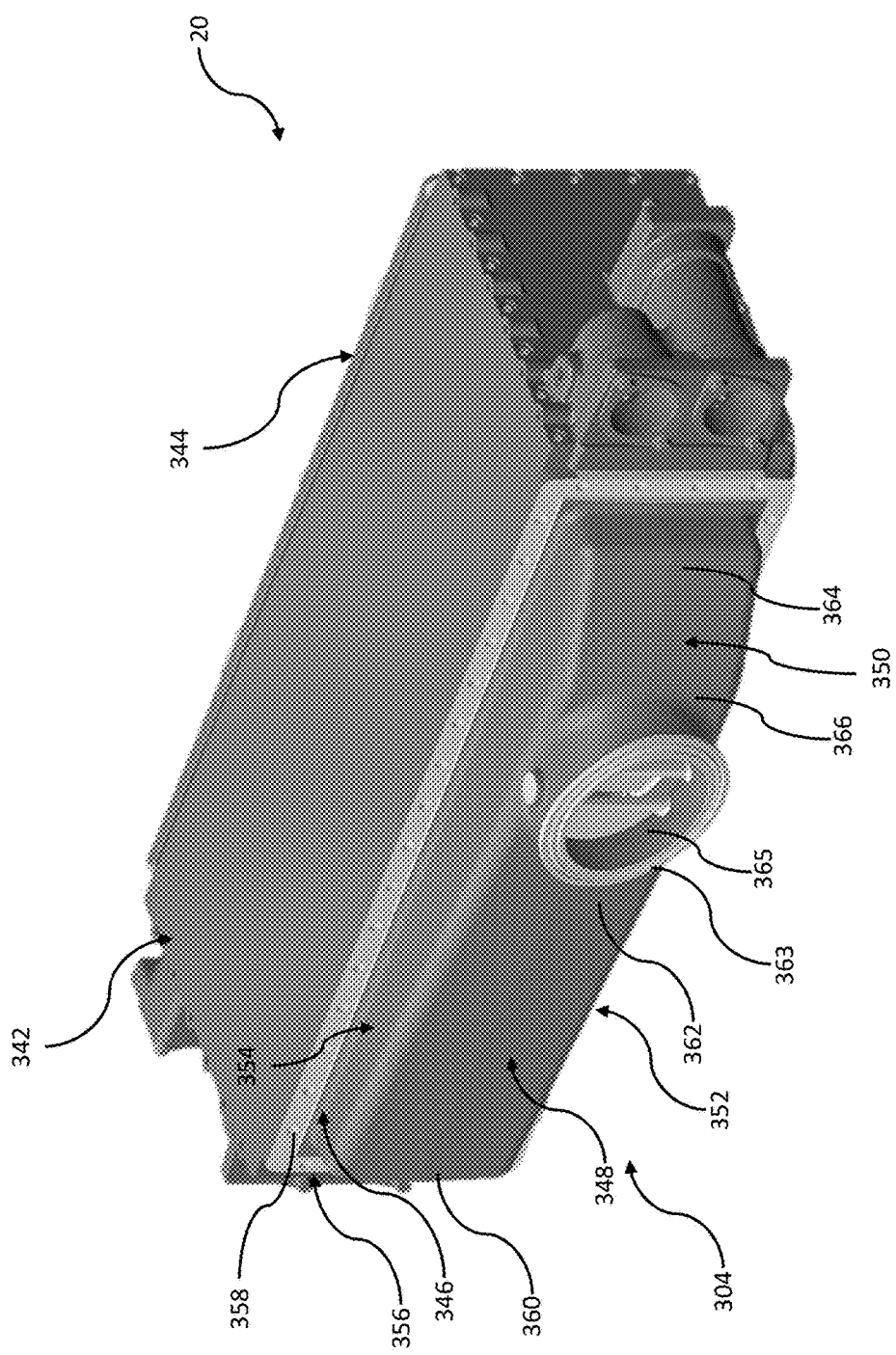
FIG. 13 is a perspective view of an aftercooler of the system of FIG. 1.

Referring now to FIG. 13, aftercooler 20 is shown with inlet diffuser 304. As shown, in addition to inlet diffuser 304, aftercooler 20 includes a housing 342 and an outlet diverter 344. Housing 342 is substantially wider than it is tall. Outlet diverter 344 includes a pair of outlet ports (not shown) which are coupled to throttles 38, 40 (FIG. 4).

Figure 14:
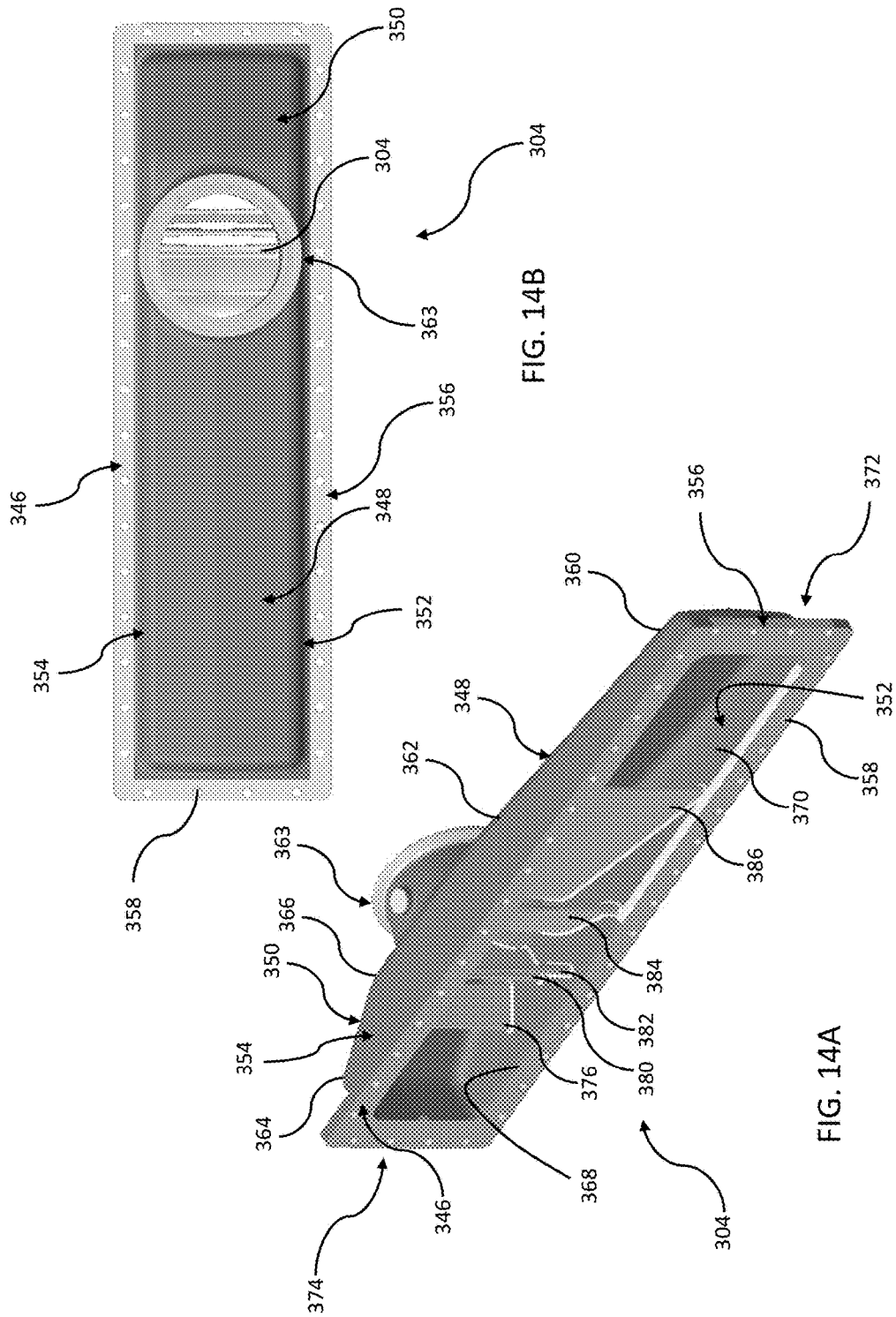
FIG. 14A is a perspective view of an inlet diffuser of the aftercooler of FIG. 13.
FIG. 14B is an end view of the inlet diffuser of FIG. 14A.
Figure 15:
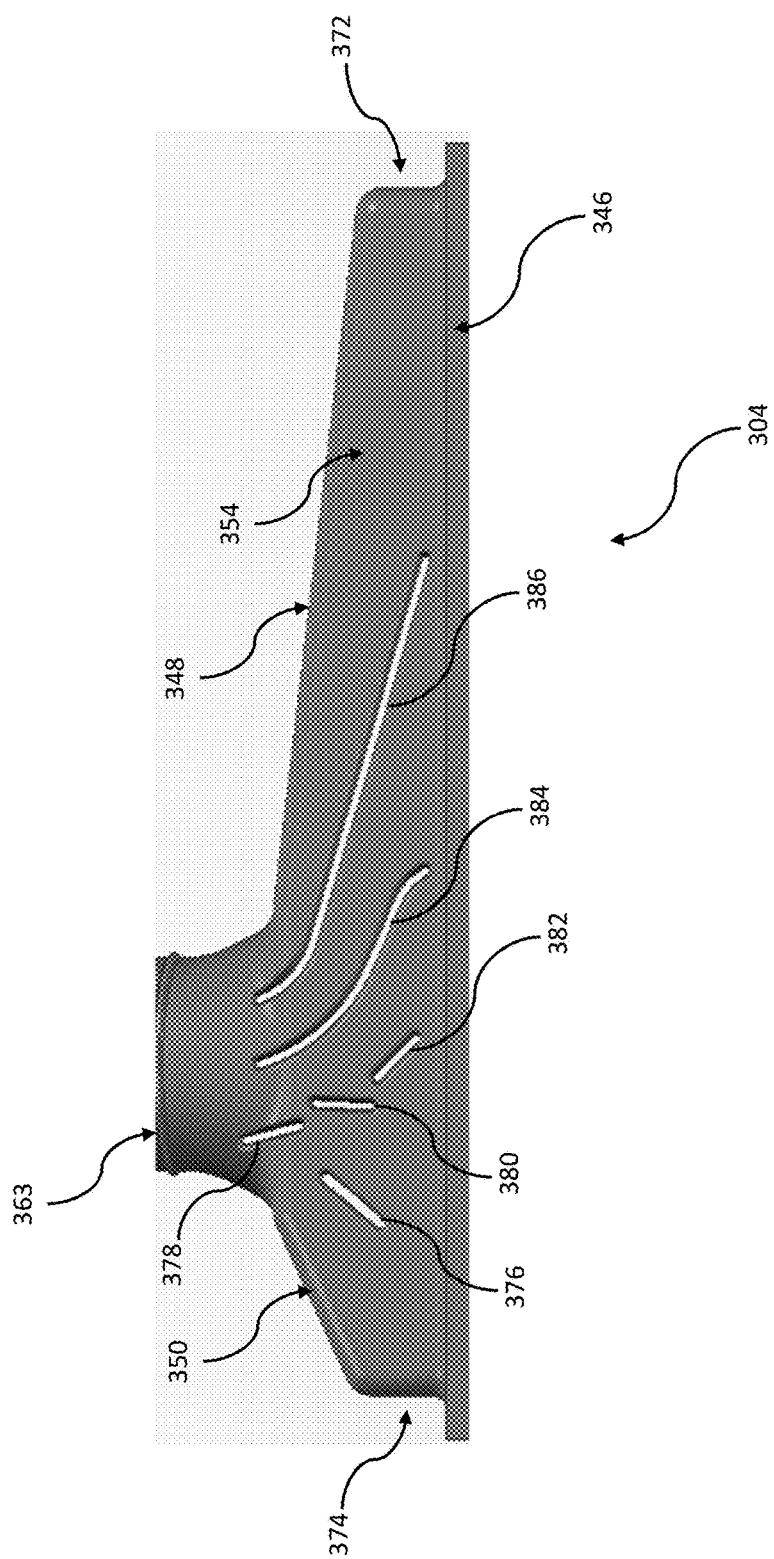
FIG. 15 is a top plan view of the inlet diffuser of FIG. 14A.

Referring now to FIGS. 13-15, inlet diffuser 304 generally includes a forward wall 346, a pair of side walls 348, 350, a lower wall 352 and an upper wall 354. Forward wall 346 includes a peripheral rim 356 with a plurality of through holes 358 for receiving fasteners (not shown) to secure diffuser 304 to housing 342 of aftercooler 20. Side wall 348, which is connected to lower wall 352 and upper wall 354, extends from an end 360 adjacent rim 356 to an end 362 adjacent inlet port 363. Inlet port 363 is configured to be coupled to the outlet of compressor 36 of high pressure turbocharger 18 and includes a central opening 365. Side wall 350 is connected between lower wall 352 and upper wall 354 and extends from an end 364 adjacent rim 356 to an end 366 adjacent inlet port 363. Lower wall 352 extends from forward wall 346 to side walls 348, 350. Similarly, upper wall 354 extends from forward wall 346 to side walls 348, 350. As best shown in FIG. 14A, forward wall 346 forms an opening 368 which delivers air to housing 342, and side walls 348, 350, lower wall 352 and upper wall 354 define an interior volume 370 of diffuser 304 across which air is distributed for delivery to housing 342.

In this embodiment of the disclosure, six fins are disposed within interior volume 370, each extending between lower wall 352 and upper wall 354. As shown in the figures, inlet port 363 is not centrally disposed on inlet diffuser 304 (i.e., is offset from a central region of diffuser 304). This is to accommodate the location of the outlet of compressor 36 of high pressure turbocharger 18. Because inlet port 363 is offset, the shape of diffuser 304 and the location and shape of the inner fins are designed to distribute incoming air evenly across opening 368 for even penetration into cooler housing 306. Upper wall 354 and lower wall 352 taper in width from inlet port 363 to end 372 of diffuser 304 and from inlet port 363 to end 374 of diffuser 304. As best shown in FIG. 15, a first fin 376 is substantially straight and slants toward end 374 with distance from inlet port 363 toward forward wall 346. A second fin 378 is substantially straight, disposed partially within port 364, and slants toward end 372 with distance from inlet port 363 toward forward wall 346. A third fin 380 is substantially straight and slants very slightly toward end 374 with distance from inlet port 363 toward forward wall 346. A fourth fin 382 is substantially straight and slants toward end 372 with distance from inlet port 363 toward forward wall 346. A fifth fin 384 is curved in an elongated S-shape and generally slants toward end 372 with distance from inlet port 363 toward forward wall 346. Fin 384 extends from within inlet port 363 to a location adjacent forward wall 346. Finally, a sixth fin 386 is partially curved adjacent inlet port 363 and extends at a slant toward end 372 with distance from inlet port 363 toward forward wall 346. Fin 386 also extends from within inlet port 363 to a location adjacent forward wall 346.

Figure 16:
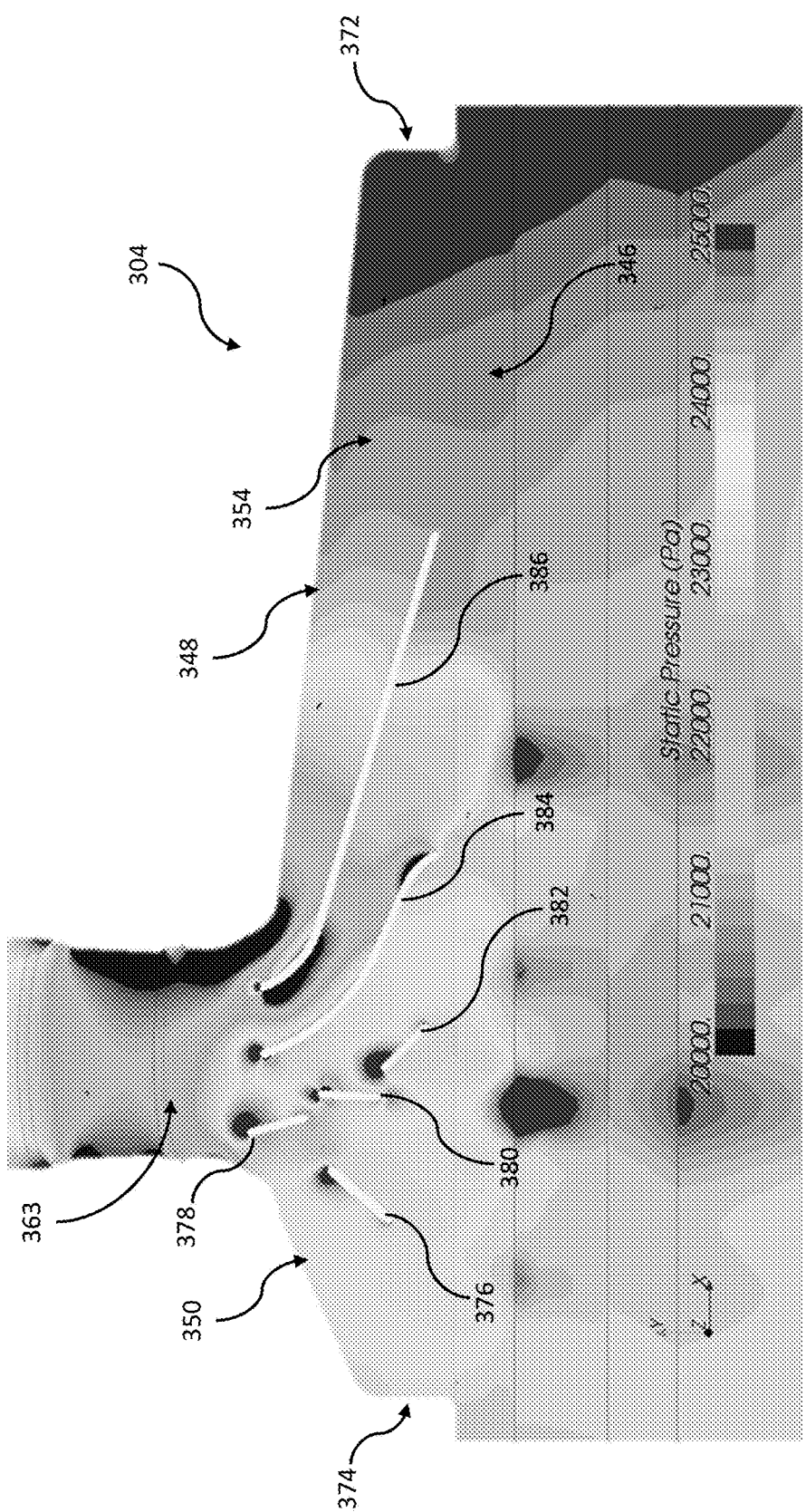
FIG. 16 depicts a simulation of static pressure within the inlet diffuser of FIG. 14A.

Referring now to FIG. 16, a simulation of static pressure at various locations within inlet diffuser 304 is shown. As shown, fins 376, 378, 380, 382, 384, 386 divert air across diffuser 304 such that the pressure of the air at various locations adjacent forward wall 346 is approximately equal. While the disclosed embodiment includes six fins having the shapes and positions shown, it should be understood that more or fewer than six fins may be employed having shapes and locations that are different from those shown.

While this disclosure has been described as having an exemplary design, the present disclosure may be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains.

Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements. The scope is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B or C may be present in a single embodiment; for example, A and B, A and C, B and C, or A and B and C.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art with the benefit of the present disclosure to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. § 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

As well, while the novel technology was illustrated using specific examples, theoretical arguments, accounts, and illustrations, these illustrations and the accompanying discussion should by no means be interpreted as limiting the technology. All patents, patent applications, and references to texts, scientific treatises, publications, and the like referenced in this application are incorporated herein by reference in their entirety.

We claim:

1. A system, comprising:
   an engine having a first cylinder bank and a second cylinder bank disposed in a VEE configuration, each of the first and second cylinder banks having a centerline that lies in a plane that passes through a crankshaft centerline, the planes defining a VEE above the crankshaft centerline;
   a low pressure turbocharger mounted within the VEE;
   an intercooler mounted within the VEE and coupled to the low pressure turbocharger to cool compressed air from the low pressure turbocharger;
   a high pressure turbocharger mounted within the VEE and coupled to an output of the intercooler; and
   an aftercooler mounted within the VEE and coupled to the high pressure turbocharger to cool compressed air from the high pressure turbocharger;
   wherein the intercooler comprises an inlet diffuser coupled to an outlet of a compressor of the low pressure turbocharger, the inlet diffuser being configured to distribute air across an outlet opening of the inlet diffuser for delivery to a housing of the intercooler;

wherein the inlet diffuser of the intercooler further comprises a forward wall having a peripheral rim, a pair of side walls, a lower wall connected to the side walls and an upper wall, the lower wall extending from the peripheral rim to a central area of the inlet diffuser and comprising an opening configured to couple to the outlet of the compressor of the low pressure turbocharger; and wherein each side wall is connected between the lower wall and the upper wall and tapers in width from a first end adjacent the peripheral rim to a second end adjacent a central area of the inlet diffuser of the intercooler.

2. The system of claim 1, wherein the aftercooler comprises an inlet diffuser coupled to an outlet of a compressor of the high pressure turbocharger, the inlet diffuser of the aftercooler being configured to distribute air across an outlet opening of the inlet diffuser of the aftercooler for delivery to a housing of the aftercooler.

3. The system of claim 2, wherein the inlet diffuser of the aftercooler further comprises a forward wall having a peripheral rim with a plurality of through holes for receiving fasteners to secure the inlet diffuser of the aftercooler to the housing of the aftercooler.

4. The system of claim 3, wherein the inlet diffuser of the aftercooler further comprises a pair of side walls, a lower wall and an upper wall, each side wall being connected between the lower wall and the upper wall and having a first end disposed adjacent the peripheral rim and a second end disposed adjacent an inlet port of the inlet diffuser of the aftercooler.

5. The system of claim 4, wherein the upper wall and the lower wall taper in width from the inlet port to a first end of the inlet diffuser of the aftercooler and from the inlet port to a second end of the inlet diffuser of the aftercooler.

6. The system of claim 4, wherein the inlet diffuser of the aftercooler further comprises a plurality of fins disposed within an interior volume of the inlet diffuser of the aftercooler and extending between the upper wall and the lower wall, the plurality of fins collectively distributing air across an outlet opening of the inlet diffuser of the aftercooler for delivery to a housing of the aftercooler.

7. The system of claim 1, wherein the opening is disposed in the central area.

8. The system of claim 1, wherein the inlet diffuser of the intercooler further comprises a plurality of ribs extending between the upper wall and the forward wall.

9. An inlet diffuser for an aftercooler, comprising:
a forward wall having a peripheral rim with a plurality of through holes for receiving fasteners to secure the inlet diffuser to a housing of the aftercooler;
an upper wall connected to the forward wall;
a lower wall connected to the forward wall;
a first side wall connected to the upper wall and the lower wall and having a first end disposed adjacent the peripheral rim and a second end disposed adjacent an inlet port of the inlet diffuser;
a second side wall connected to the upper wall and the lower wall and having a first end disposed adjacent the peripheral rim and a second end disposed adjacent the inlet port; and
a plurality of fins disposed within an interior volume of the inlet diffuser and extending between the upper wall and the lower wall, the plurality of fins collectively distributing air across an outlet opening of the inlet diffuser for delivery to the housing of the aftercooler;

wherein the plurality of fins includes a first fin which is substantially straight and slanted toward a first end of the inlet diffuser such that one end of the first fin adjacent the inlet port is farther from the first end of the inlet diffuser than another end of the first fin adjacent the forward wall;

wherein the plurality of fins includes a second fin which is substantially straight, partially disposed within the inlet port, and slanted toward a second end of the inlet diffuser such that one end of the second fin adjacent the inlet port is farther from the second end of the inlet diffuser than another end of the second fin adjacent the forward wall;

wherein the plurality of fins includes a third fin which is substantially straight and slanted toward the first end of the inlet diffuser such that one end of the third fin adjacent the inlet port is farther from the first end of the inlet diffuser than another end of the third fin adjacent the forward wall;

wherein the plurality of fins includes a fourth fin which is substantially straight and slanted toward the second end of the inlet diffuser such that one end of the fourth fin adjacent the inlet port is farther from the second end of the inlet diffuser than another end of the fourth fin adjacent the forward wall; and wherein the plurality of fins includes a fifth fin which is curved in an elongated S-shape and slanted toward the second end of the inlet diffuser such that one end of the fifth fin adjacent the inlet port is farther from the second end of the inlet diffuser than another end of the fifth fin adjacent the forward wall, the one end being disposed within inlet port.

10. The inlet diffuser of claim 9, wherein the upper wall and the lower wall taper in width from the inlet port to a first end of the inlet diffuser and from the inlet port to a second end of the inlet diffuser.

11. The inlet diffuser of claim 9, wherein the first side wall is longer than the second side wall and the inlet port is offset from a central region of the inlet diffuser.

12. The inlet diffuser of claim 9, wherein the plurality of fins includes a sixth fin which is partially curved at a first end and slanted toward the second end of the inlet diffuser such that the first end which is disposed within the inlet port is farther from the second end of the inlet diffuser than a second end of the sixth fin disposed adjacent the forward wall.

13. A system, comprising:
an engine having a first cylinder bank and a second cylinder bank disposed in a VEE configuration, each of the first and second cylinder banks having a centerline that lies in a plane that passes through a crankshaft centerline, the planes defining a VEE above the crankshaft centerline;
a low pressure turbocharger mounted within the VEE;
an intercooler mounted within the VEE and coupled to the low pressure turbocharger to cool compressed air from the low pressure turbocharger;
a high pressure turbocharger mounted within the VEE and coupled to an output of the intercooler; and
an aftercooler mounted within the VEE and coupled to the high pressure turbocharger to cool compressed air from the high pressure turbocharger;
wherein the intercooler comprises an inlet diffuser coupled to an outlet of a compressor of the low pressure turbocharger, the inlet diffuser being configured to distribute air across an outlet opening of the inlet diffuser for delivery to a housing of the intercooler; and wherein the inlet diffuser comprises a forward wall having a peripheral rim with a plurality of through holes for receiving fasteners to secure the inlet diffuser of the intercooler to the housing of the intercooler, a pair of side walls, a lower wall, an upper wall and a plurality of ribs extending between the upper wall and the forward wall, each side wall being connected between the lower wall and the upper wall and tapering in width from a first end adjacent the peripheral rim to a second end adjacent a central area of the inlet diffuser of the intercooler.

\* \* \* \* \*